（12）United States Patent
Wang et al.

US009607014B2

(10) Patent No.: US 9,607,014 B2
(45) Date of Patent: Mar. 28, 2017

(54) IMAGE TAGGING

(71) Applicant: Adobe Systems Incorporated, San Jose, CA (US)

(72) Inventors: Zhaowen Wang, Urbana, IL (US); Jianchao Yang, San Jose, CA (US); Zhe Lin, Fremont, CA (US); Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 663 days.

(21) Appl. No.: 14/068,238

(22) Filed: Oct. 31, 2013

(65) Prior Publication Data
US 2015/0120760 A1 Apr. 30, 2015

(51) Int. Cl.
*G06F 17/30* (2006.01)
*G06K 9/62* (2006.01)

(52) U.S. Cl.
CPC ..... *G06F 17/30265* (2013.01); *G06K 9/6263* (2013.01); *G06K 2209/27* (2013.01)

(58) Field of Classification Search
CPC .................................................. G06F 17/30244
USPC ........... 707/E17.03, 741, 744, 769; 382/118, 382/157; 706/12
See application file for complete search history.

(56) References Cited

U.S. PATENT DOCUMENTS

| 7,715,597 | B2 * | 5/2010 | Costache | G06F 17/30259 382/118 |
|---|---|---|---|---|
| 7,966,327 | B2 * | 6/2011 | Li | G06F 17/30979 707/737 |
| 8,429,168 | B1 * | 4/2013 | Chechik | G06F 17/30247 707/741 |
| 2006/0101060 | A1 * | 5/2006 | Li | G06F 17/30247 |
| 2006/0140455 | A1 * | 6/2006 | Costache | G06F 17/30259 382/118 |
| 2007/0216773 | A1 * | 9/2007 | Kojima | G06F 17/30017 348/207.1 |
| 2013/0046761 | A1 * | 2/2013 | Soderberg | G06F 17/30038 707/736 |

(Continued)

OTHER PUBLICATIONS

Chechik, Gal, et al., "Large Scale Online Learning of Image Similarity Through Ranking", The Journal of Machine Learning Research, 11, (2010), 1109-1135.

(Continued)

*Primary Examiner* — Baoquoc N To
(74) *Attorney, Agent, or Firm* — Shook, Hardy & Bacon L.L.P.

(57) ABSTRACT

A system is configured to annotate an image with tags. As configured, the system accesses an image and generates a set of vectors for the image. The set of vectors may be generated by mathematically transforming the image, such as by applying a mathematical transform to predetermined regions of the image. The system may then query a database of tagged images by submitting the set of vectors as search criteria to a search engine. The querying of the database may obtain a set of tagged images. Next, the system may rank the obtained set of tagged images according to similarity scores that quantify degrees of similarity between the image and each tagged image obtained. Tags from a top-ranked subset of the tagged images may be extracted by the system, which may then annotate the image with these extracted tags.

20 Claims, 11 Drawing Sheets

(56) References Cited

U.S. PATENT DOCUMENTS

| | | | | |
|---|---|---|---|---|
| 2013/0290222 A1* | 10/2013 | Gordo | ............... | G06F 17/30247 706/12 |
| 2014/0079297 A1* | 3/2014 | Tadayon | .................. | G06K 9/00 382/118 |
| 2014/0201126 A1* | 7/2014 | Zadeh | .................... | G06K 9/627 706/52 |
| 2014/0280113 A1* | 9/2014 | Hohwald | .......... | G06F 17/30268 707/728 |

OTHER PUBLICATIONS

Chen, Xiangyu, et al., "Efficient Large-Scale Image Annotation by Probabilistic Collaborative Multi-Label Propagation", Proceedings of the International Conference on Multimedia, ACM, (2010), 35-44.

Mensink, Thomas, et al., "Metric Learning for Large Scale Image Classification: Generalizing to New Classes at Near-Zero Cost", Computer Vision—ECCV, (2012), 488-501.

Shen, Xiaohui, et al., "Mobile Product Image Search by Automatic Query Object Extraction", Computer Vision—ECCV, (2012), 114-127.

Tighe, Joseph, et al., "SuperParsing: Scalable Nonparametric Image Parsing with Superpixels", Computer Vision—ECCV, (2010), 352-365.

Tsai, David, et al., "Large-Scale Image Annotation Using Visual Synset", 2011 IEEE International Conference on, (2011), 611-618.

Weinberger, Kilian Q., et al., "Distance Metric Learning for Large Margin Nearest Neighbor Classification", J. Mach. Learn Res., 10, (Jun. 2009), 207-244.

Weston, James, et al., "Large Scale Image Annotation Learning to Rank with Joint Word-Image Embeddings", Machine Learning, 81 (1), (2010), 21-35.

Weston, James, et al., "Scaling Up to Large Vocabulary Image Annotation", Proceedings of the Twenty-Second International Joint Conference on Artificial Intelligence—vol. 3, (2011), 2764-2770.

* cited by examiner

IMAGE TAGGING

TECHNICAL FIELD

The subject matter disclosed herein generally relates to the processing of data. Specifically, the present disclosure addresses systems and methods to facilitate image tagging.

BACKGROUND

Image annotation generally involves assigning textual tags to visual images so that the content and style of the images may be described by the tags. It has important applications in image organization (e.g., image retrieval or image summarization) and understanding images (e.g., scene categorization, or object detection or recognition).

However, automatic image annotation is generally a challenging problem. In contrast to object recognition (e.g., recognizing objects depicted in images), the label space for image annotations may be much larger, and the distribution of tags may be highly unbalanced. Therefore, traditional approaches that involve training a classifier for each tag (e.g., label) are neither efficient nor effective. In addition, there may be a huge semantic gap between visual images and textual tags. Images with distinctly different appearances may correspond to the same tag, while visually similar images may be annotated with different tags. It is therefore not easy to model a mapping from visual representations to textual representations using a compact parametric model, especially when the images to be tagged depict diversified content. Moreover, new tags are continually being invented (e.g., from social media), and the semantic meaning of existing tags may evolve with time. How to incorporate new tags and new meanings with lowest cost is a practical consideration for an image annotation system.

Recently, image databases of unprecedentedly large scale have become available with the growth of social networks and photo sharing web sites. By exploiting rich collections of images and corresponding tags (e.g., labels) in these large databases, people have applied various non-parametric methods to infer knowledge about new images from similar ones in the database. Provided that there is a sufficiently large number of previously tagged images in the database, it is very likely there exists at least some images which are very similar to a given test image and have the same or very similar tags. In this way, the tags (e.g., label information) of the test image may be directly transferred from those similar images without using any parametric mapping functions. In addition, such non-parametric approaches may utilize very little image classifier training, which may greatly facilitate incorporation of new images and new tags. Such non-parametric approaches include scene parsing, image classification, and image annotation.

However, non-parametric methods typically achieve good performance only with a large database of tagged images. Consequently, the computational cost of matching a test image with all images in the database is very high. Also, large scale data sets constructed from web data usually contain noisy label information (e.g., from the presence of inaccurate tags) and have an unbalanced distribution (e.g., of tags), which further limits the performance of non-parametric methods.

BRIEF DESCRIPTION OF THE DRAWINGS

Some embodiments are illustrated by way of example and not limitation in the figures of the accompanying drawings.

DETAILED DESCRIPTION

Figure 1:
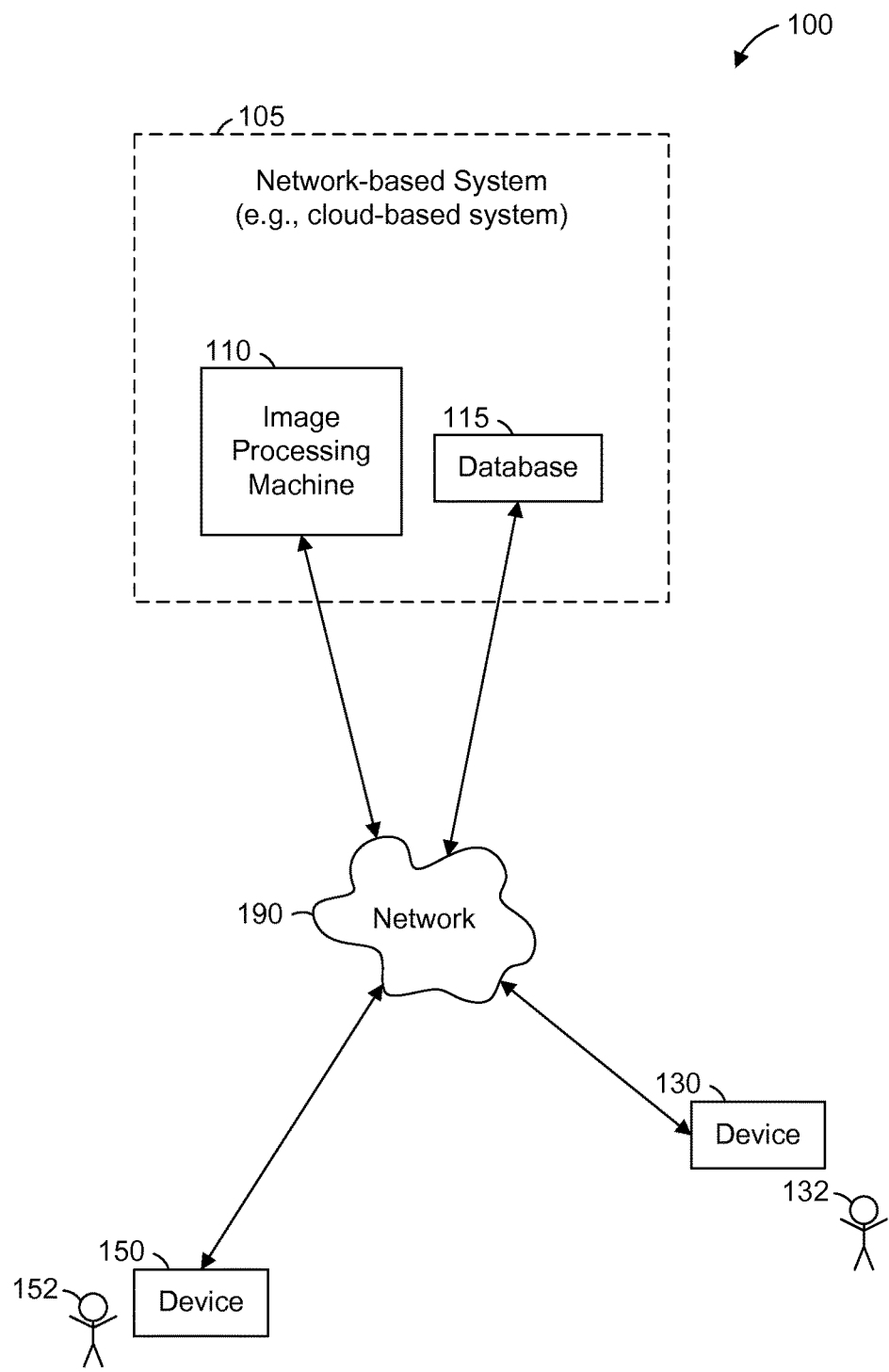
FIG. 1 is a network diagram illustrating a network environment suitable for image annotation (e.g., image tagging), according to some example embodiments.

Example methods and systems are directed to annotating (e.g., tagging) one or more images. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The example systems and methods discussed herein implement a new two-step non-parametric image annotation process. The first step (e.g., first pass) is to use some existing information retrieval technique to quickly identify a local neighborhood of tagged images for the test image within a database of tagged images (e.g., reference images whose tags are already known). In the second step (e.g., second pass), a learned similarity function is applied to the retrieved images in the identified neighborhood to further identify a set of tagged images with similar tags (e.g., similar semantics). Continuing the second step, the tags to be applied to the test image are determined based on tags of the reference images, where the tags may be weighted by the similarities of their corresponding images (e.g., similarity scores). Accordingly, these example systems and methods provide significant advantages in terms of speed during the retrieval step and accurate matching due to the learned similarity function. The learned similarity function is label-independent and therefore can be readily applied to new tags (e.g., new tags appearing in a continually updated database of tagged images). In addition, robust tag prediction may be achieved by weighting the tags from multiple reference images.

As an overview, a system that includes one or more machines may be configured to perform one or more operations of an algorithm that results in an image being tagged. For example, an image to be tagged may be referred to as a "taggable" image, and the system may access such a taggable image and generate a set of vectors for the taggable image. The set of vectors may be generated by mathematically transforming the taggable image, such as by applying a mathematical transform to predetermined regions of the taggable image. The system may then query a database of tagged images (e.g., pre-tagged reference images) by submitting the set of vectors as search criteria to a search engine that is configured to search the database. Thus, the querying of the database may obtain a set of tagged images in response to submission of the vector set as the search criteria. Next, the system may rank the obtained set of tagged images according to similarity scores that quantify degrees of similarity between the taggable image and each tagged image obtained. Tags from a top-ranked subset of the tagged images may be extracted by the system, which may then annotate the taggable image with these extracted tags. This annotation of the taggable image may be based on the similarity scores, the ranks of tagged images within the top-ranked subset, or both.

In some example embodiments, the system calculates the similarity scores that quantify the degrees of similarity between the taggable image and each tagged image. Such similar scores may be calculated based on a bilinear similarity matrix (M). For example, the system may generate (e.g., determine or calculate) the matrix (M) such that it satisfies the condition that, when used to calculate similarity scores, a first similarity score between a first tagged image and a second tagged image exceed a second similarity score between the first tagged image and a third tagged image, as a consequence of a first distance (e.g., vector distance or other mathematical distance) between tags of the first tagged image and tags of the second tagged image being less than a second distance between tags of the first tagged image and tags of the third tagged image. In other words, this condition for generating the matrix (M) may specify that the matrix (M), when used to calculate similarity scores, calculates a higher similarity score for two images that have similar tags (e.g., indicated by a relatively lower distance) than for two images that have dissimilar tags (e.g., indicated by a relatively higher distance).

A good similarity matrix (M) that measures the semantic closeness of two images is important for accurate annotation of an image (e.g., test image or a candidate image). Traditional machine-learning approaches to generating (e.g., training) a good similarity matrix typically involve finding a similarity matrix that can be applied to any pair of images in a global data space (e.g., within the entire database of images). Such traditional approaches are often founded upon a very restrictive assumption about the data distribution. In contrast, generating a localized similarity matrix for each of multiple partitions of the entire data space can adapt to an unbalanced data distribution more flexibly, but it also increases model complexity and involves the nontrivial task of making good partitions of the data space.

According to the example systems and methods discussed herein, the similarity function (e.g., implementing the similarity matrix (M)) is used in a manner between local and global. It is used in a local manner in being only applied to image pairs with in the local neighborhood images, which are identified in the retrieval step. It is also used in the global manner, because a single similarity function (e.g., a single similarity matrix (M)) is shared in common by any and all neighborhoods in the global data space (e.g., the database of images). Hence, this similarity function may be called a "locally shared similarity function." Therefore, according to the two-step procedure, a compact parametric model is first used to characterize the local structure of the data distribution (e.g., find the local neighborhood within the database of images), and the global structure is captured by application of the learned similarity function in a non-parametric way. As a result, both compactness and flexibility may be achieved in an example image annotation system at the same time.

FIG. 1 is a network diagram illustrating a network environment 100 suitable for image annotation, according to some example embodiments. The network environment 100 includes an image processing machine 110, a database 115, and devices 130 and 150, all communicatively coupled to each other via a network 190. The image processing machine 110, the database 115, and the devices 130 and 150 may each be implemented in a computer system, in whole or in part, as described below with respect to FIG. 11. The database 115 may store a large collection of images, and such images may include previously tagged reference images (e.g., images whose corresponding annotations are already known). Hence, the database 115 may store many previously tagged reference images with their corresponding tags. Moreover, the database 115 may include or provide a search engine for identifying and retrieving one or more of these previously tagged reference images, in response to submission of a test image as search criteria. With or without the database 115, the image processing machine 110 may form all or part of a network-based system 105 (e.g., a cloud-based image annotation system) that provides one or more image annotation services to the devices 130 and 150.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
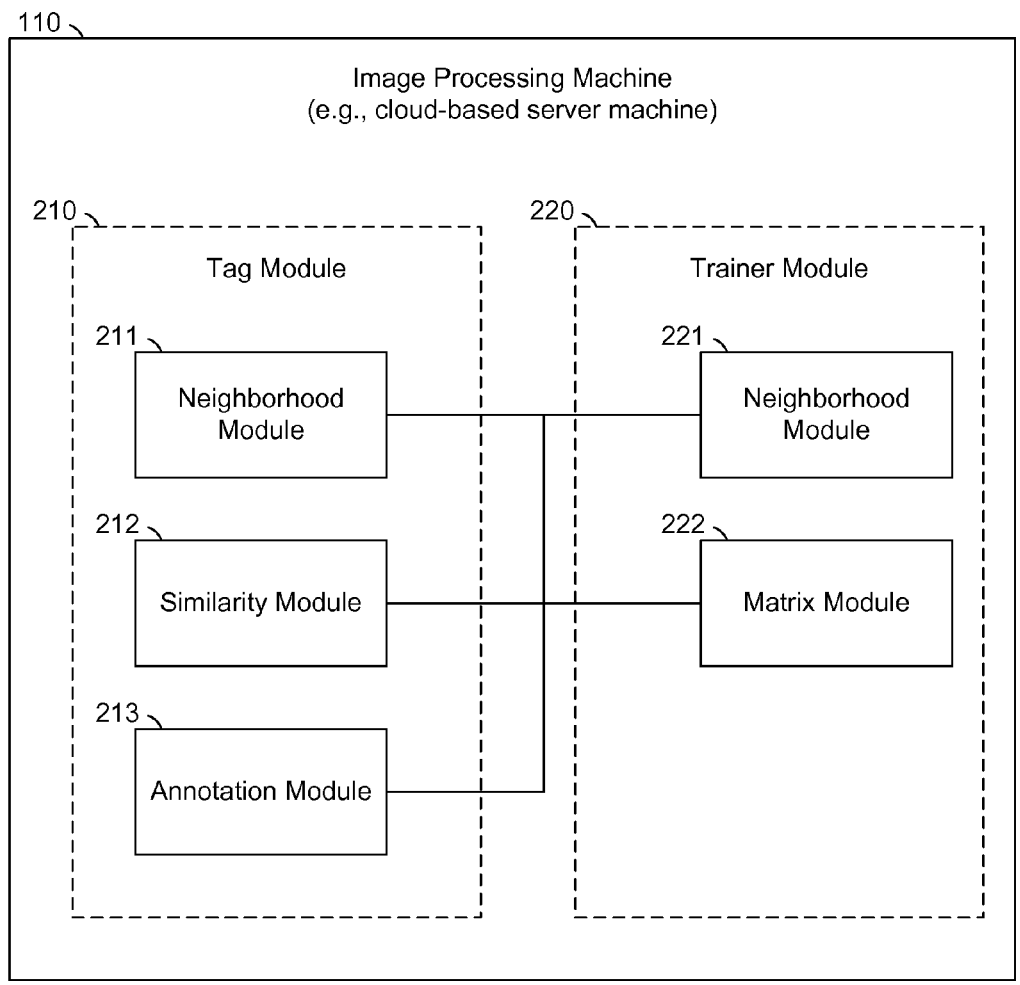
FIG. 2 is a block diagram illustrating components of an image processing machine, according to some example embodiments.

FIG. 2 is a block diagram illustrating components of the image processing machine 110, according to some example embodiments. The image processing machine 110 is shown as including a neighborhood module 211, a similarity module 212, an annotation module 213, a neighborhood module 221, and a matrix module 222, all configured to communicate with each other (e.g., via a bus, shared memory, or a switch).

According to some example embodiments, the neighborhood module 211, the similarity module 212, and the annotation module 213 may form all or part of a tag module 210. According to certain example embodiments, the neighborhood module 221 and the matrix module 222 may form all or part of a trainer module 220.

In various example embodiments, the image processing machine 110 may be a cloud-based server machine configured to provide one or more image processing services to client devices (e.g., devices 130 and 150). For example, the trainer module 220 may configure the image processing machine 110 to generate a similarity matrix (e.g., a bilinear similarity matrix (M)), and the tag module 210 may configure the image processing machine 110 to annotate an image received from the device 130 based on the generated similarity matrix.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
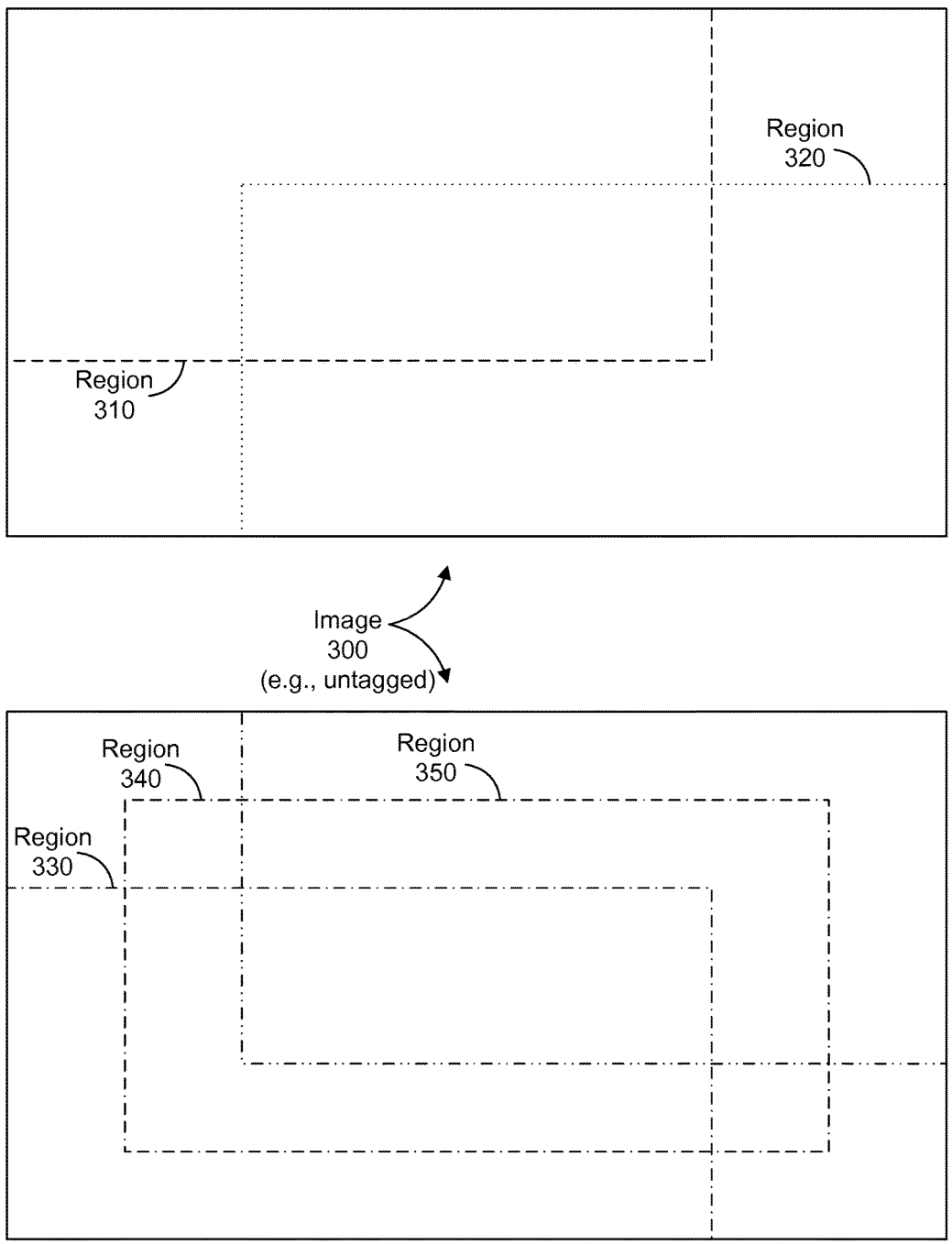
FIG. 3 is a layout diagram illustrating regions of an image (e.g., a taggable image), according to some example embodiments.

FIG. 3 is a layout diagram illustrating regions of an image 300, according to some example embodiments. The image 300 is taggable (e.g., an image that can be tagged or further tagged), and various example embodiments of the image 300 may be previously tagged or previously untagged. For example, the image 300 may be an untagged image submitted by the device 130 to the image processing machine 110 for annotation. Such an untagged image herein may be called a test image or a candidate image to be annotated.

As shown, the image 300 may be considered as having multiple regions (e.g., sub-regions of the entirety of the image 300). In the example shown, a region 310 (e.g., first region) may encompass the upper left 80 percent of the image 300, and a region 320 (e.g., second region) may encompass the lower right 80 percent of the image 300. For clarity, this is shown in the top portion of FIG. 3. Continuing the example shown, a region 330 (e.g., third region) may encompass the lower left 80 percent of the image 300; a region 340 (e.g., fourth region) may encompass the center 80 percent of the image 300; and a region 350 (e.g., fifth region) may encompass the upper right 80 percent of the image 300. For clarity, these are shown in the bottom portion of FIG. 3. Accordingly, image processing operations (e.g., mathematical transformations) may be performed on any one or more of these five regions 310-350, as well as the entirety of the image 300 itself. Although the illustrated example uses regions that encompass 80 percent of the image 300, various example embodiments may use other percentages (e.g., 75% or 92%) of the image 300.

Figure 4:
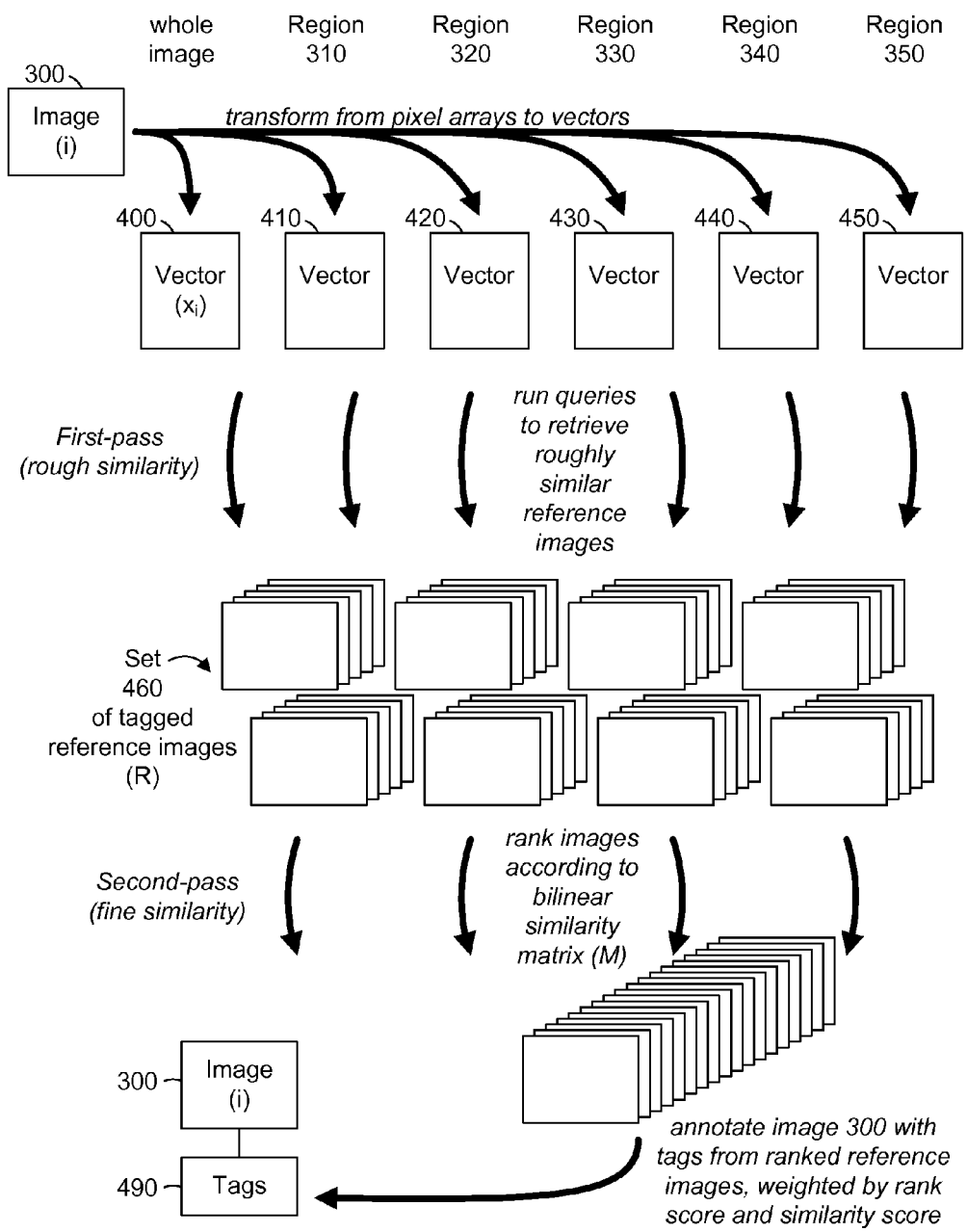
FIG. 4 is a conceptual diagram illustrating a two-step (e.g., two pass) approach to annotating (e.g., tagging) an image, according to some example embodiments.

FIG. 4 is a conceptual diagram illustrating a two-step (e.g., two pass) approach to annotating (e.g., tagging) the image 300, according to some example embodiments. As shown in the top of FIG. 4, the image 300 may be subdivided by the neighborhood module 211 (e.g., within the tag module 210) of the image processing machine 110 into the regions 310-350, as discussed above with respect to FIG. 3. Each of the regions 310-350, as well as the entirety of the image 300 (e.g., the whole image), may be treated as an array of pixels (e.g., pixel array). Mathematical transformations (e.g., vector transforms, such as Discrete Cosine Transform (DCT) or Fast Fourier Transform (FFT)) may be applied (e.g., by the neighborhood module 211) to any one or more of the image 300 and its regions 310-350, as shown by curved arrows.

Each of these mathematical transformations generates a vector that represents the original array of pixels. As illustrated FIG. 4, the entirety of the image 300 may be represented by a vector 400. Similarly, the region 310 may be represented by a vector 410; the region 320 may be represented by a vector 420; region 330 may be represented by a vector 430; the region 340 may be represented by a vector 440; and the region 350 may be represented by a vector 450.

In accordance with the first step in the two-step approach described herein, the vectors 400-450 may be submitted by the neighborhood module 211 as search criteria to a search engine (e.g., a search engine that provides an interface to the database 115), which may result in execution of queries to retrieve tagged reference images that are roughly similar to the image 300 (e.g., the image to be tagged). The search engine (e.g., for the database 115) may implement any one or more contemporary techniques suitable for retrieving (e.g., identifying and providing) visually similar images given an input image submitted as search criteria. An example of such a technique is described in U.S. patent application Ser. No. 13/953,394, filed Jul. 29, 2013 and entitled "Visual Pattern Recognition in an Image," which application is incorporated by reference herein in its entirety. In some example embodiments, a commercially available (e.g., off-the-shelf) algorithm or a publicly available algorithm is implemented to retrieve such visually similar images.

The results of such queries are illustrated in FIG. 4 as a set 460 of tagged reference images (R) for the image 300, which may be considered as a local neighborhood of the image 300 with respect to a large library of tagged reference images stored in the database 115. The neighborhood module 211 may receive the set 460 as search results from the queries, and provide the search results to the similarity module 212 of the image processing machine 110.

In accordance with the second step in the two-step approach described herein, the similarity module 212 calculates similarity scores for each image in the set 460 of tagged reference images (R) for the image 300. Calculation of a similarity score may be performed by applying a bilinear similarity function that uses a bilinear similarity matrix (M), which may be previously generated (e.g., as discussed below with respect to FIG. 9-10). The similarity module 212 may then rank (e.g., order) the images within the set 460 based on the calculated similarity scores.

In further accordance with the second step in the two-step approach described herein, the annotation module 213 of the image processing machine 110 may extract tags (e.g., annotations) that correspond to a subset (e.g., a top-ranked subset) of the set 460 of tagged reference images (R) for the image 300. This may be performed by identifying the subset based on the calculated similarity scores and then accessing the tags that correspond to images from the identified subset (e.g., from the database 115). To annotate the image 300, the annotation module 213 may then update image metadata for the image 300 with the accessed tags. For example, as illustrated in FIG. 4, tags 490 may include one or more tags extracted from a top-ranked subset of the set 460, and the tags 490 may then be associated with the image 300 (within the database 115).

Figure 5:
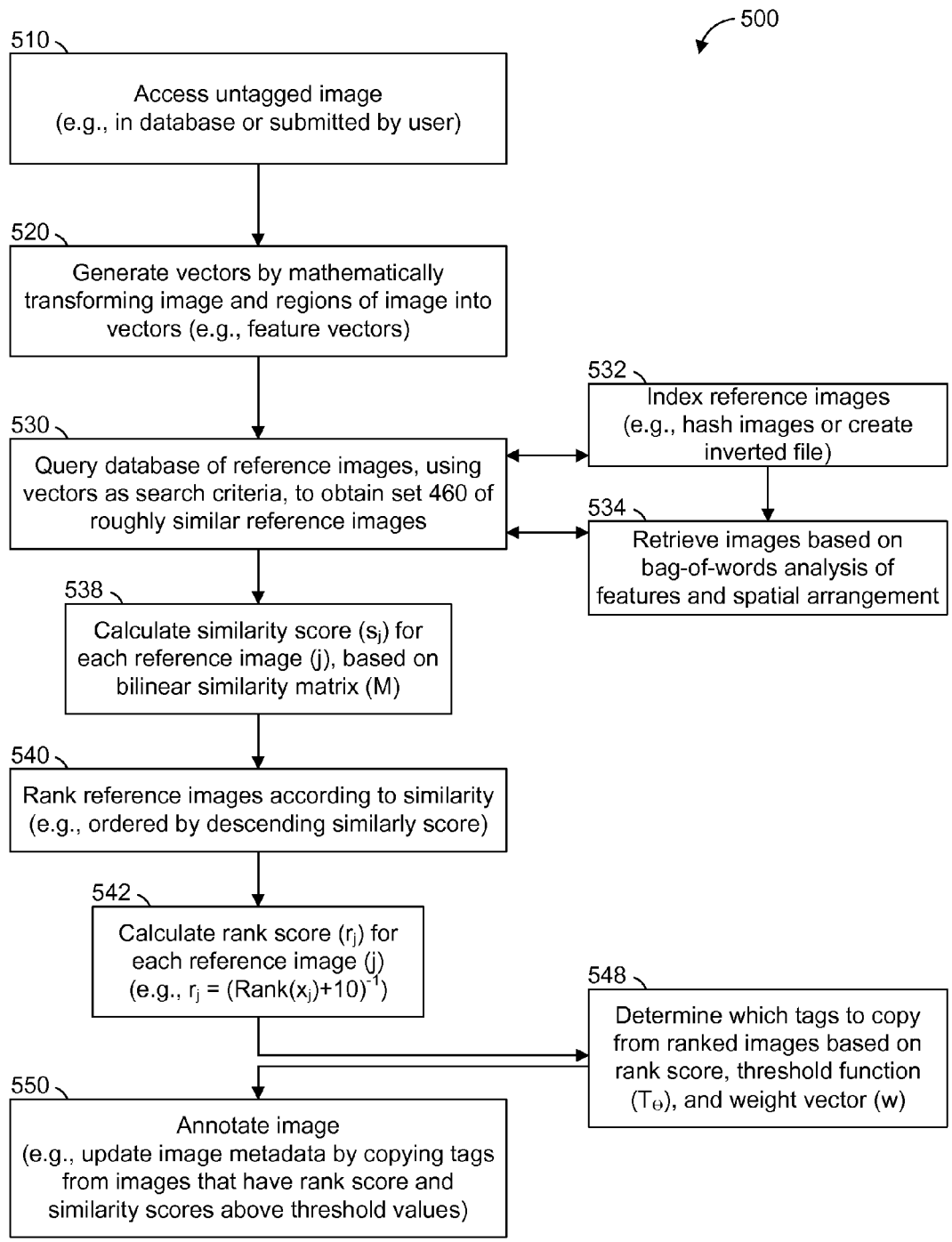
FIG. 5 is a flowchart illustrating operations of the image processing machine in performing a method of annotating an image, according to some example embodiments.

FIG. 5 is a flowchart illustrating operations of the image processing machine 110 in performing a method 500 of annotating the image 300, according to some example embodiments. Operations in the method 500 may be performed by modules described above with respect to FIG. 2. As shown in FIG. 5, the method 500 includes operations 510, 520, 530, 540, and 550.

In operation 510, the neighborhood module 211 accesses the image 300 (e.g., an untagged taggable image to be tagged) from the database 115. In some example embodiments, the neighborhood module 211 receives the image 300 as a submission from the device 130 (e.g., as a submission by the user 132 to obtain one or more tags for the image 300).

In operation 520, the neighborhood module 211 generates the vectors 400-450 discussed above with respect to FIG. 4. For example, one or more of the vectors 400-450 may be generated by mathematically transforming the image 300, the region 310 of the image 300, the region 320 of the image 300, the region 330 of the image 300, the region 340 of the image 300, the region 350 of the image 300, or any suitable combination thereof. These vectors 400-450 may be respectively considered as feature vectors of the image 300 or the regions 310-350 thereof.

In operation 530, the neighborhood module 211 queries the database 115, which may store tagged reference images and their corresponding tags (e.g., annotations). For example, the neighborhood module 211 may submit the vectors 400-450 as search criteria to a search engine configured to search the database 115. Accordingly, this querying of the database 115 may obtain the set 460 of tagged reference images (R), as discussed above with respect to FIG. 4. The neighborhood module 211 may then provide the set 460 to the similarity module 212.

In operation 540, the similarity module 212 ranks the tagged reference images within the set 460 of tagged reference images (R) for the image 300. This ranking may be performed according to similarity scores that quantify degrees of similarity between the image 300 (e.g., the untagged taggable image) and each of the tagged reference images within the set 460. Calculation of the similarity scores is discussed in greater detail below with respect to operation 538. In performing operation 540, the similarity module 212 may order (e.g., sequence) the tagged reference images within the set 460 by descending similarity score, thus generating a ranked list in which the tagged reference image that is most similar to the image 300 (e.g., has the highest similarity score) is at the top of the ranked list.

In operation 550, the annotation module 213 tags (e.g., annotates) the image 300 with the tags 490, which may be copies of tags corresponding to a subset of the ranked images from operation 540. The tagging of the image 300 may be performed by updating image metadata for the image 300 (e.g., within the database 115) by copying tags from those ranked images that have a rank score above a threshold ranked value and a similarity score above a threshold similarity value. Accordingly, the annotation module 213 may perform operation 550 based on the similarity scores of the tagged reference images within the set 460, the rankings of the tagged reference images within the set 460, or any suitable combination thereof.

As also shown in FIG. 5, various example embodiments of the method 500 include one or more of operations 532, 534, 538, 542, and 548. One or more of operations 532 and 534 may be performed as part (e.g., a precursor task, a subroutine, or a portion) of operation 530, in which the neighborhood module 211 queries the database 115.

In operation 532, the neighborhood module 211 indexes the tagged reference images stored in the database 115 (e.g., for faster retrieval). For example, this indexing may be performed by hashing one or more of the tagged reference images, creating an inverted file, or both. In operation 534, the neighborhood module 211 retrieves one or more of the tagged reference images based on a bag-of-words analysis of visual features (e.g., as represented by feature vectors) and based on spatial arrangement of those visual features. For example, the database 115 may include a search engine configured to retrieve images by performing a bag-of-words analysis of visual features, performing an analysis of their spatial arrangement, or both. Accordingly, in performing operation 534, the neighborhood module 211 may cause the search engine to retrieve the set 460 of tagged reference images (R) as so configured. In some example embodiments, instead of a bag-of-words analysis, any other suitable type of analysis of discriminative image representations may be used.

Operation 538 may be performed prior to operation 540, in which the similarity module 212 ranks the images within the set 460 of tagged reference images (R). In operation 538, the similarity module 212 calculates a similarity score for each tagged reference image in the set 460, resulting in calculation of similarity scores for all tagged reference images in the set 460. These calculations may be based on a bilinear similarity matrix (M), which may be previously generated (e.g., as discussed below with respect to FIG. 9-10). As noted above, a similarity score quantifies a degree of similarity between the image 300 (e.g., as an untagged taggable image) and a tagged reference image among the set 460 of tagged reference images.

One or more of operations 542 and 548 may be performed prior to operation 550, in which the annotation module 213 tags the image 300 with the tags 490. In operation 542, the similarity module 212 calculates a rank score for each tagged reference image in the set 460, resulting in calculation of ranks scores for all tagged reference images in the set 460. These calculations may be based on the ranks of the tagged reference images within the set 460, as determined in operation 540. In operation 548, the annotation module 213 determines (e.g., identifies) the tags 490 to be used (e.g., copied) in annotating the image 300 in operation 550. In other words, the annotation module 213 selects which tags to copy from the ranked set 460 of tagged reference images (R) or a subset thereof.

Operation 548 may be performed based on one or more of the rank scores calculated in operation 542. For example, if one of the tagged reference images in the set 460 has a set of tags (e.g., annotations) stored in its metadata (e.g., within the database 115), a threshold function $T_\theta(v)$ may be applied by the annotation module 213 to the set of tags. By application of this threshold function $T_\theta(v)$, the rank score of the tagged reference image, the similarity score of the tagged reference image, or both, may be used as mathematical weights to increase or reduce the likelihood that each tag among the set of tags will be used for annotating the image 300 in operation 550. Such mathematical weights may be represented by a weight vector w. In some example embodiments, the weight vector w reduces the likelihood that a common tag (e.g., a tag that frequently occurs within the database 115) will be selected in operation 548. An example of a threshold function $T_\theta(v)$ and an example of a weight vector are provided below in Equation (2).

Figure 6:
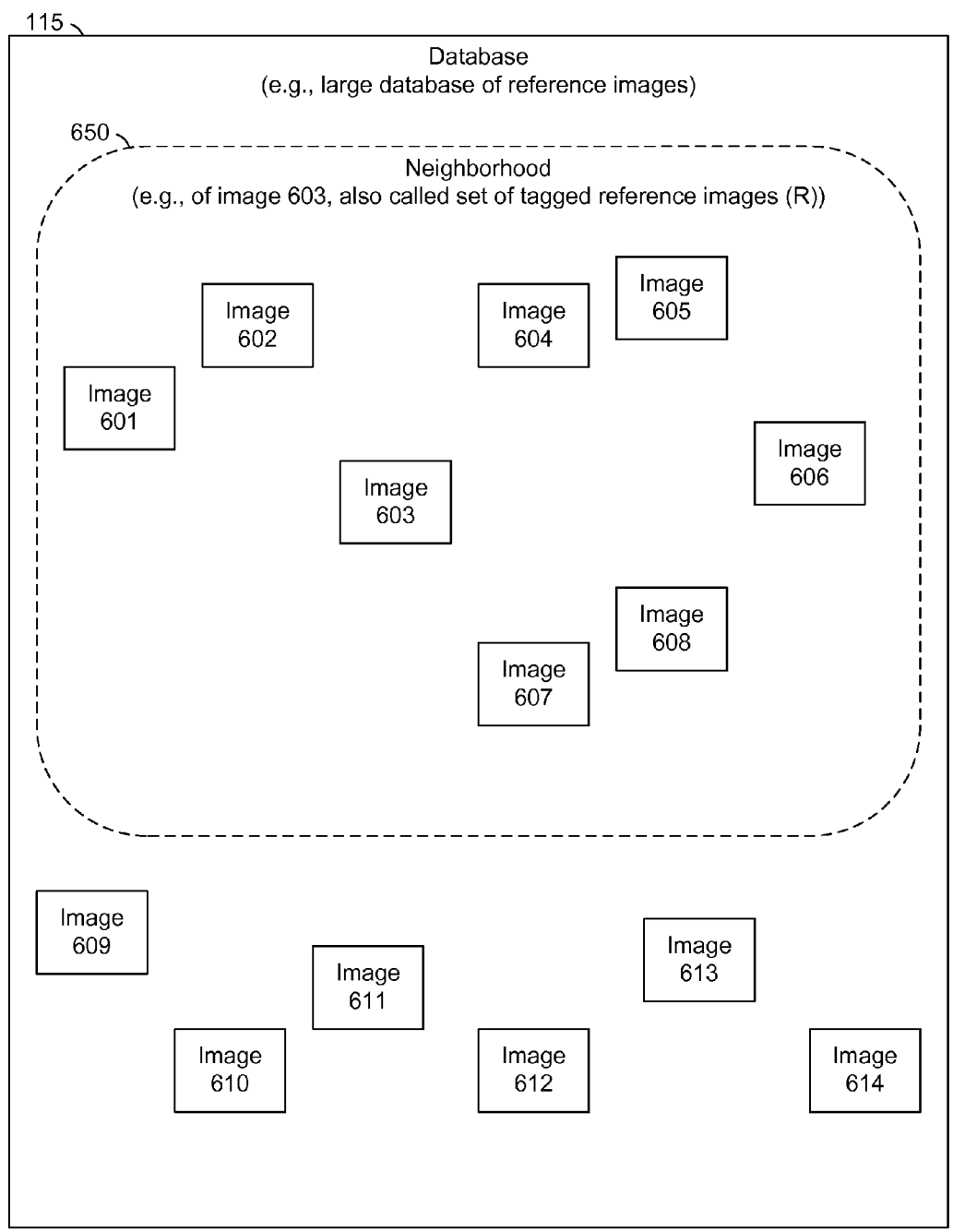
FIG. 6-7 are block diagrams illustrating a database of reference images, according some example embodiments.
Figure 7:
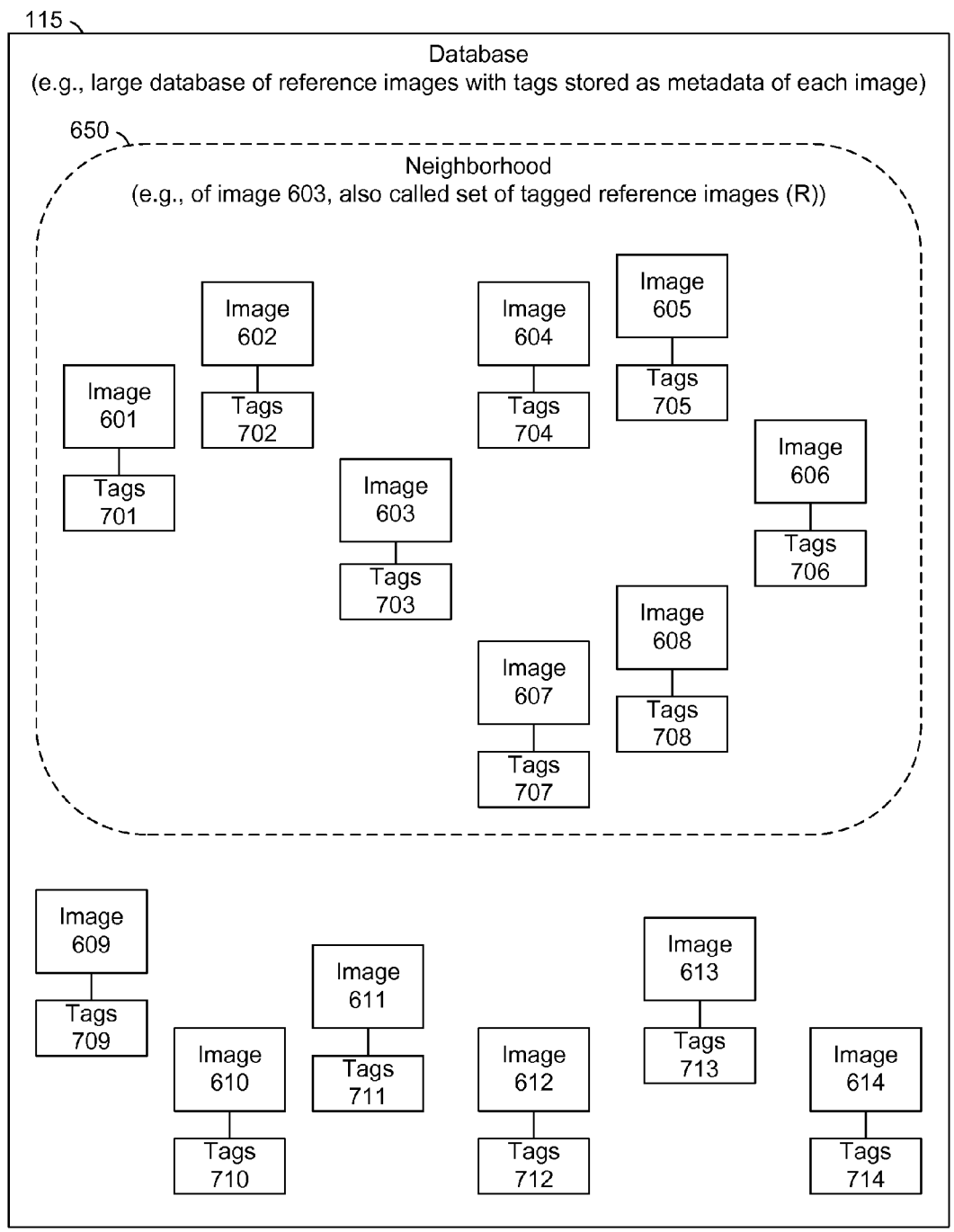

FIG. 6-7 are block diagrams illustrating the database 115, according some example embodiments. FIG. 6 shows the database 115 as a large database of reference images 601-614, which may be tagged reference images (e.g., images whose corresponding annotations are known and stored in their corresponding metadata). The image 603 is one such image stored in the database 115, and the image 603 has a neighborhood 650 of images that are visually similar to the image 603 (e.g., as determinable by any one or more contemporary similarity algorithms). The neighborhood 650 of the image 603 may also be called a set (e.g., subset) of reference images (e.g., tagged reference images) stored in the database 115. In FIG. 6, the neighborhood 650 encompasses the images 601-608, because the images 601, 602, and 604-608 are visually similar to the image 603.

As shown in FIG. 7, each of the images 601-614 may have its corresponding tags 701-714. Accordingly, the image 601 may be tagged with tags 701 (e.g., a set of one or more tags) by including the tags 701 in metadata of the image 601. Likewise, the image 602 may be tagged with tags 702 (e.g., a different set of one or more tags) by including the tags 702 in metadata of the image 602. Similar relationships may exist for each of images 602-614. In some example embodiments, the tags 701-714 are each represented by a vector (e.g., annotation vector) in which each dimension of the vector represents a different tag (e.g., a descriptive word or phrase, such as "landscape" or "still life," for the corresponding image) and the value of each dimension specifies presence or absence of that tag. Accordingly, FIG. 7 illustrates the images 601-614 being stored with their respective tags 701-714. As in FIG. 6, the neighborhood 650 is also shown in FIG. 7 as encompassing the images 601-608 (e.g., with their respective tags 701-708).

Figure 8:
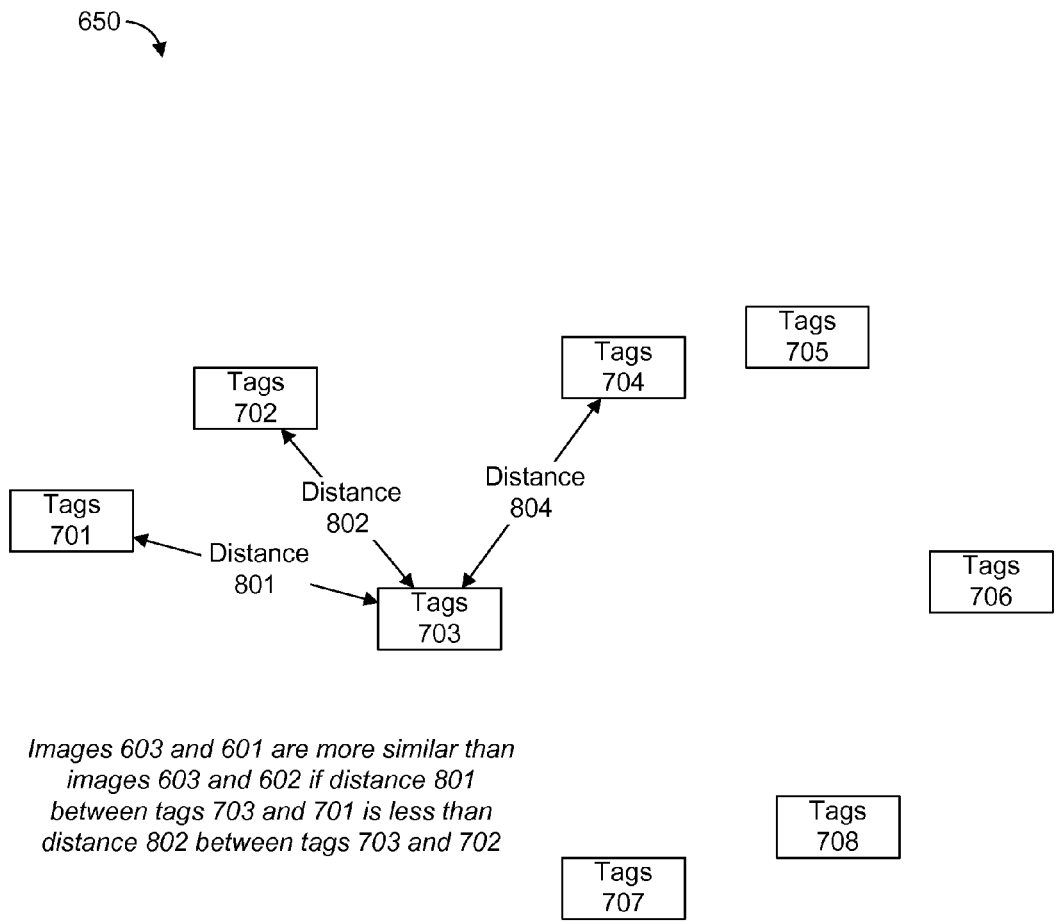
FIG. 8 is a block diagram illustrating distances among tags (e.g., annotation vectors) that correspond to reference images in the database, according to some example embodiments.

FIG. 8 is a block diagram illustrating distances 801, 802, and 804 among the tags 701-704 (e.g., annotation vectors) that respectively correspond to images 601-604 in the neighborhood 650 of the image 603, according to some example embodiments. Since each of the tags 701-704 may be represented as annotation vector, each of the distances 801, 802, and 804 may be vector distances (e.g., Hamming distances). As shown, the distance 801 may be a vector distance between the tags 701 and 703. Similarly, the distance 802 may be a vector distance between the tags 702 and 703. Likewise, the distance 804 may be a vector distance between the tags 704 and 703. As noted in FIG. 8, the images 603 and 601 may be deemed to be more similar to each other than the images 603 and 602, if the distance 801 is less than the distance 802. In other words, greater similarity between two images may be inferred from shorter vector distances between their tags (e.g., annotation vectors). For clarity, additional distances involving tags 705-708 are not shown, but may nonetheless be present in various example embodiments. In addition, according to various example embodiments, similar distances may be calculated between vectors (e.g., feature vectors) that represent the images 601-604, and shorter distances may indicate greater similarity between the images 601-604 themselves, in contrast to greater similarity between the tags 701-704 for those images 601-604.

Figure 9:
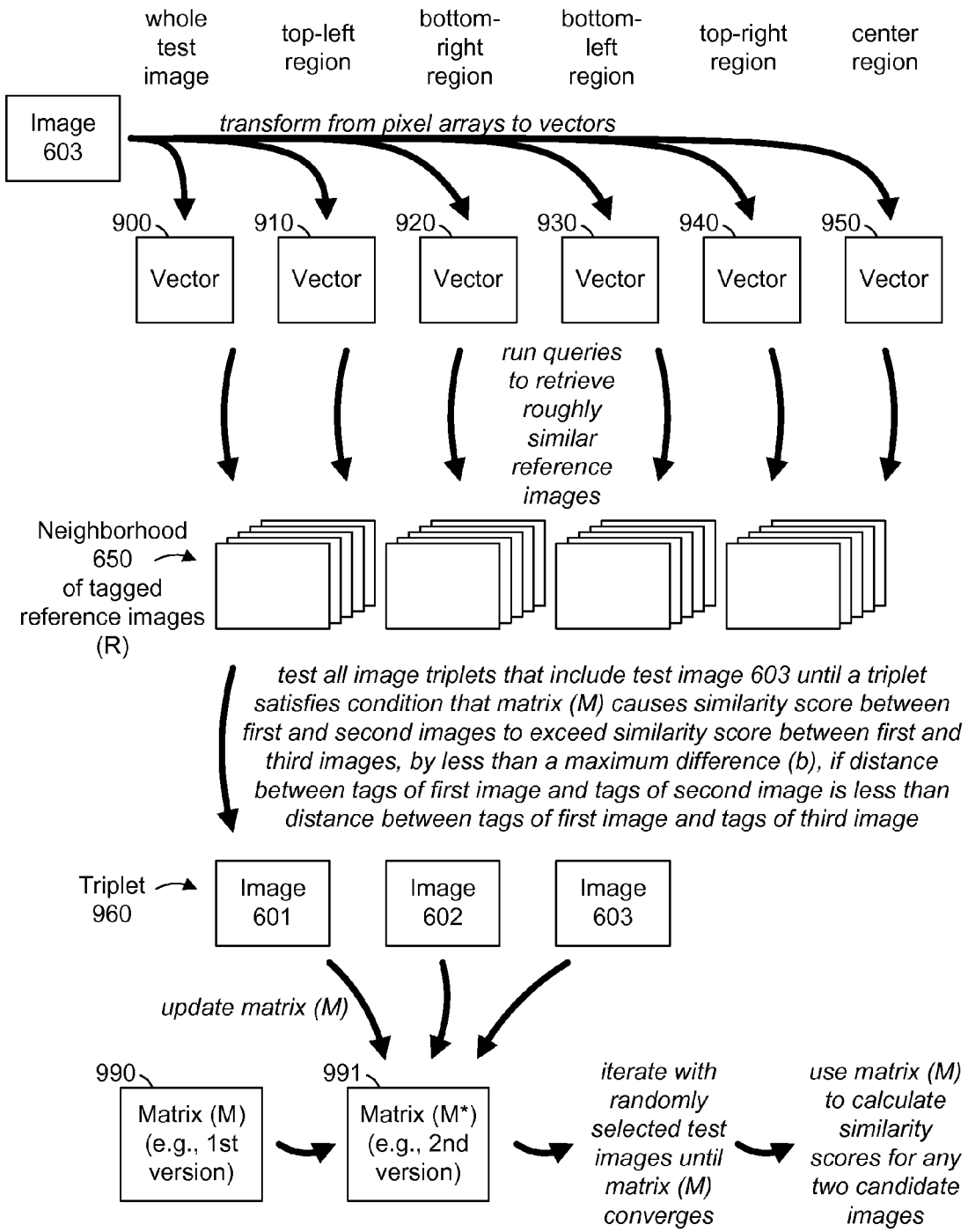
FIG. 9 is a conceptual diagram illustrating an approach to generating or updating a similarity matrix (M), according to some example embodiments.

FIG. 9 is a conceptual diagram illustrating an approach to generating or updating a bilinear similarity matrix (M), according to some example embodiments. The similarity matrix (M) may be generated from the database 115, which may store a large collection of tagged reference images. As a representative example, FIG. 9 depicts generating or updating the similarity matrix (M) by processing the image 603, which is stored in the database 115.

As shown in the top of FIG. 9, the image 603 may be subdivided by the neighborhood module 221 (e.g., within the trainer module 220) of the image processing machine 110 into regions similar to the regions 310-350, as discussed above with respect to FIG. 3. Each of these regions of the image 603, as well as the entirety of the image 603 (e.g., the whole image), may be treated as an array of pixels (e.g., pixel array). Mathematical transformations (e.g., vector transforms, such as DCT or FFT) may be applied (e.g., by the neighborhood module 221) to any one or more of the image 603 and its regions, as shown by curved arrows.

Each of these mathematical transformations generates a vector that represents the original array of pixels. As illustrated FIG. 9, the entirety of the image 603 may be represented by a vector 900. Similarly, a top-left region of the image 603 may be represented by a vector 910; a bottom-right region of the image 603 may be represented by a vector 920; a bottom-left region of the image 603 may be represented by a vector 930; a top-right region of the image 603 may be represented by a vector 940; and a center region of the image 603 may be represented by a vector 950.

Analogous to the first step in the two-step approach described herein, the vectors 900-950 may be submitted by the neighborhood module 221 as search criteria to a search engine for the database 115, which may result in execution of queries to retrieve the neighborhood 650 (e.g., set) of tagged reference images that are roughly similar to the image 603 (e.g., the image currently being processed to generate or update the similarity matrix (M)). The search engine (e.g., for the database 115) may implement any one or more contemporary techniques suitable for retrieving (e.g., identifying and providing) visually similar images given an input image submitted as search criteria. The results of such queries are illustrated in FIG. 9 as the neighborhood 650 of tagged reference images (R) for the image 603, which may be considered as a local neighborhood of the image 603 with respect to all of the tagged reference images stored in the database 115. The neighborhood module 221 may receive the neighborhood 650 as one or more search results from the queries, and provide the one or more search results to the matrix module 222 (e.g., within the trainer module 220) of the image processing machine 110.

At this point, the generation or updating of the similarity matrix (M) departs from the above-described two-step approach. With the neighborhood 650 determined (e.g., identified), the matrix module 222 may then test all image triplets that include the image 603 (e.g., the image being processed to generate or update the similarity matrix (M)). This testing may be performed with a pre-existing similarity matrix (M) or an initialized similarity matrix (e.g., the identity matrix) until an image triplet satisfies the condition that: the similarity matrix (M), when used to calculate similarity scores, causes a first similarity score between first and second images of the image triplet to exceed a second similarity score between the first and third images of the image triplet (e.g., by less than a maximum difference (b)), if the distance between tags of the first image and tags of the second image is less than the distance between tags of the first image and tags of the third image. This condition is expressed mathematically below in Equation (3).

As shown in FIG. 9, this testing of the neighborhood 650 may result in a triplet 960 for which the current similarity matrix (M) (e.g., pre-existing or initialized) the satisfies this condition. FIG. 9 depicts the triplet 960 as including the images 601, 602, and 603. Using this triplet 960, the current similarity matrix may be adjusted (e.g., optimized) from a first version, shown as matrix 990, to a second version, shown as matrix 991. An example of an optimization solution is provided below in Equation (4).

As noted in FIG. 9, this approach to generating or updating the bilinear similarity matrix (M) may be iterated to obtain increasingly better versions of the similarity matrix (M). For example, the above-described processing of the image 603 may be repeated with randomly selected images (e.g., test images) from the database 115, until the similarity matrix (M) converges (e.g., to a globally applicable similarity matrix (M) for the entirety of the database 115).

Furthermore, as also noted in FIG. 9, once the bilinear similarity matrix (M) is finalized (e.g., converged), the similarity matrix (M) may be used to calculate a similarity score between any two candidate images (e.g., stored in the database 115, received from the device 130, or any suitable combination thereof). Thus, the generation or updating of the similarity matrix (M) may be included as part of a machine-learning algorithm for training an image classifier or other image processing system.

Figure 10:
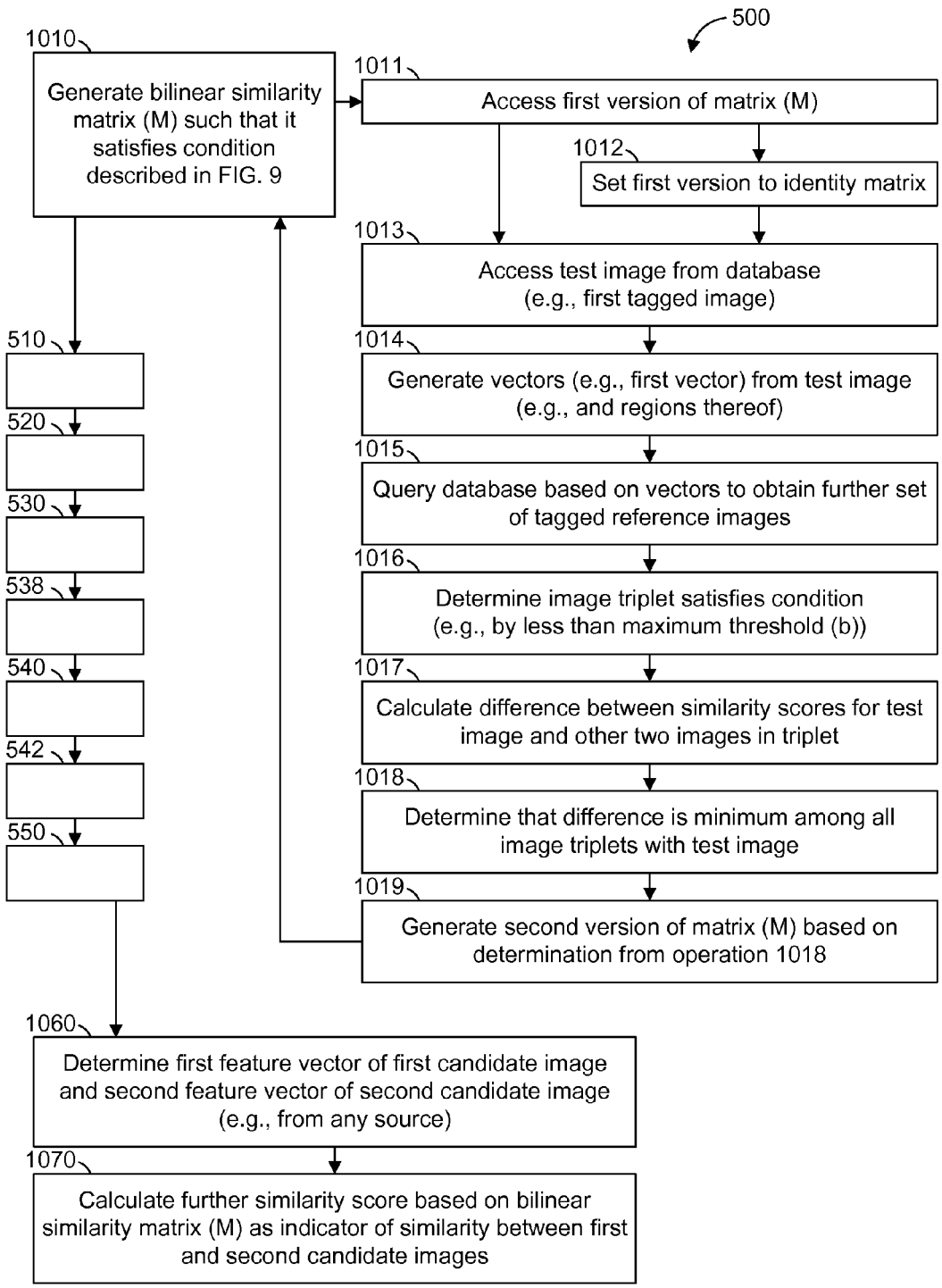
FIG. 10 is a flowchart illustrating operations of the image processing machine in generating or updating the similarity matrix (M), according to some example embodiments.

FIG. 10 is a flowchart illustrating further operations of the image processing machine 110 in generating, updating, or using the bilinear similarity matrix (M), according to some example embodiments. As shown in FIG. 10, these further operations may be part of the method 500, discussed above with respect to FIG. 5. These further operations include any one or more of operations 1010, 1060, and 1070.

Example embodiments that generate or update the bilinear similarity matrix (M) may include operation 1010, which may be performed at any time before operation 538 in the method 500. In FIG. 10, operation 1010 is illustrated as being performed prior to operation 510. According to various example embodiments, operation 1010 may be performed iteratively, with randomly selected test images (e.g., image 603), until the similarity matrix (M) converges.

In operation 1010, the trainer module 220 of the image processing machine 110 generates the bilinear similarity matrix (M) such that it satisfies the condition described above with respect to FIG. 9. As noted above, this condition is expressed below in Equation (3).

As shown in FIG. 10, one or more of operations 1011, 1012, 1013, 1014, 1015, 1016, 1017, 1018, and 1019 may be performed as part (e.g., a precursor task, a subroutine, or a portion) of operation 1010. In operation 1011, the neighborhood module 221 within the trainer module 220 accesses the matrix 990 (e.g., a first version of the similarity matrix (M)). For example, the matrix 990 may be accessed (e.g., from the database 115) as a previously generated version, previously updated version, or working version of the bilinear similarity matrix (M).

In some example embodiments, the matrix 990 (e.g., first version of the similarity matrix (M)) does not yet exist or is empty, obsolete, or corrupt. In such example embodiments, the neighborhood module 221 may perform operation 1012 by setting the matrix 990 to the identity matrix. This may have the effect of initializing the matrix 990.

In operation 1013, the neighborhood module 221 accesses the image 603 (e.g., as a test image) from the database 115. As noted above, the database 115 may store a large library of tagged reference images. Hence, operation 1013 may have the effect of accessing one of these tagged reference images for testing the matrix 990 (e.g., first version of the similarity matrix (M)) as part of generating or updating the bilinear similarity matrix (M). In this context, the image 603 may be considered as a first tagged image that is being accessed in operation 1013.

In operation 1014, the neighborhood module 221 generates one or more of the vectors 900-950, as described above with respect to FIG. 9. As noted above, the entirety of the image 603 (e.g., test image) may be represented by a vector 900 (e.g., first vector), and the vectors 910-950 may respectively represent a top-left region, a bottom-right region, a bottom-left region, a top-right region, and a center region of the image 603.

In operation 1015, the neighborhood module 221 queries the database 115 (e.g., by submitting one or more of the vectors 900-950 as search criteria) to obtain the neighborhood 650 (e.g., set) of tagged reference images (R) for the image 603. This may have the effect of executing queries to retrieve tagged reference images that are roughly similar to the image 603 (e.g., test image).

In operation 1016, the matrix module 222 within the trainer module 220 determines that the triplet 960 of images (e.g., inclusive of the images 601-603) satisfies the condition described above with respect to FIG. 9 and expressed mathematically below in Equation (3).

In operation 1017, the matrix module 222 calculates a difference that corresponds to the triplet 960. This difference for the triplet 960 is calculated as the difference between a first similarity score and a second similarity score, where the first similarity score quantifies a degree of similarity between the image 603 (e.g., first tagged image) and the image 601 (e.g., second tagged image), and where the second similarity score quantifies a degree of similarity between image 603 (e.g., first tagged image) and the image 602 (e.g., third tagged image).

In operation 1018, the matrix module 222 determines that the difference calculated in operation 1070 is a minimum difference among all image triplets within the neighborhood 650 that include the image 603 (e.g., the test image) and satisfy the condition described above with respect to FIG. 9 and expressed in Equation (3). Since the condition holds for the triplet 960, if the distance 801 (e.g., between tags 701 and 703) is less than the distance 802 (e.g., between tags 702 and 703), use of the matrix 990 (e.g., as the first version of the bilinear similarity matrix (M)) to calculate similarity scores results in the first similarity score (e.g., representing similarity between the images 601 and 603) exceeding the second similarity score (e.g., representing similarity between images 602 and 603).

In operation 1019, in response to one or both of the determinations made in operation 1017 (e.g., that the triplet 960 satisfies the condition) and operation 1018 (e.g., that the triplet 960 has the minimum difference in similarity scores), the matrix module 222 generates the matrix 991 (e.g., a second version of the similarity matrix (M)). For example, the matrix 991 may be generated (e.g., and stored in the database 115) as an updated version, new version, or final version of the bilinear similarity matrix (M). The generation of the matrix 991 may have the effect of adjusting (e.g., optimizing) the bilinear similarity matrix (M) from the matrix 990 (e.g., the first version) to the matrix 991 (e.g., the second version).

Various example embodiments may use the bilinear similarity matrix (M) for purposes other than image tagging. For example, a well-iterated and converged similarity matrix (M) may be used to directly compare two candidate images and quantify their mutual similarity. One or both of such candidate images may be accessed from the database 115, received via the network 190 from the device 130, or obtained in any other fashion. For such situations, shown in FIG. 10, operations 1060 and 1070 may be performed after operation 550. In various example embodiments, however, operation 1060 may be performed at any time prior to operation 1070, and operation 1070 may be performed at any time after operation 1010. In the example presently discussed below, the neighborhood module 211 and the similarity module 212 (e.g., within the tag module 210) are configured to work together as an image similarity subsystem (e.g., image matching engine, an image search engine, an image retrieval engine, or any suitable combination thereof).

In operation 1060, the neighborhood module 211 determines feature vectors from the two candidate images. For example, the neighborhood module 211 may access a first candidate image and a second candidate image and then generate a first feature vector from the first candidate image and a second feature vector from the second candidate image. The generation of such feature vectors may be performed in a manner analogous to the above-described generation of the vectors 400-450 or the vectors 900-950.

In operation 1070, the similarity module 212 calculates a similarity score that quantifies a degree of similarity between the first and second candidate images. The similarity score may be calculated based on the bilinear similarity matrix (M) (e.g., as generated or updated according to operation 1010). The calculation of the similarity score may be performed in a manner analogous to that described above with respect to operation 538. In some example embodiments, the similarity module 212 uses the calculated similarity score to communicate an assessment of how similar the two candidate images are to each other. For example, if the first candidate image was submitted by the user 132 as a search criterion, the similarity module 212 may return the second candidate image as a search result (e.g., match), based on the calculated similarity score. In some example embodiments, the similarity module 212 provides the calculated similarity score to one or more additional modules of the image processing machine 110, for further image processing functions.

In addition to the foregoing discussion, the two-step image tagging algorithm discussed herein may be described in greater mathematical detail. Suppose there is an annotated image database $\{x_i, y_i\} i=1 \ldots n$, where $x_i$ is the i-th image and $y_i$ is the associated tag(s). $y_i$ is represented as an indicator vector such that $y_i(a)=1$ if the a-th tag is assigned to image $x_i$ and $y_i(a)=0$ otherwise.

Given a new test image x, an image annotation system may be configured to automatically determine or predict its annotation $y \in \{0, 1\}^{|A|}$. First, all the database images within a neighborhood of x in the feature space are retrieved: $\{x_i | i \in R\}$. The images may be indexed by inverted file or hashing in advance for fast retrieval. In some example embodiments, the system uses the "Waldo" retrieval technique, which can quickly search similar images by both bag-of-words features and their spatial arrangement. In some example embodiments, a high recall of relevant images retrieved in the set R is desired so that there is a good chance of finding one or more true tags of the test image in the latter half of this two-step approach. Some example embodiments of the system use an ensemble of retrieval $R = U_l R_l$ to increase the recall rate, where each retrieval $R_l$ is obtained by using a sub-region of image x as query. This is analogous to searching similar images by object parts, which gives more tolerance to global structure deformation. In some example embodiments, the image annotation system uses regular rectangular areas at the center and four corners of the image to extract sub-regions, with each rectangle having a width and height as large as 0.8 times that of the whole image. The retrieval results found using these sub-regions as queries may then be combined with the results from using the entire image as a query.

Once the reference image set R is obtained, more accurate similarity can be measured by the image annotation system using a bilinear similarity matrix (M). Specifically, the similarity between test image x and a reference image $x_j$, $j \in R$ can be expressed as $$s_j = x^T M x_j, \quad (1)$$

where M is a positive semi-definite matrix. Other forms of similarity metrics, such as Mahalanobis distance, are also possible. Details on how to obtain a good similarity function M are discussed below. Given similarity scores $\{s_j\}$, the images in set R are sorted by the image annotation system according to the descending order of $s_j$, and the rank of image $x_j$ is obtained by the image annotation system as $Rank(x_j)$. The image annotation system may assign a rank score to $x_j$ as $r_j = (Rank(x_j)+10)^{-1}$. The annotation of x may then be predicted by the image annotation system based on all of the reference annotations $\{y_j\}_{j \in R}$ weighted by their similarity scores $\{s_j\}_{j \in R}$ and rank scores $\{r_j\}_{j \in R}$:

$$y = T_\theta \left( \sum_{j \in R} s_j r_j y_j \odot w \right), \quad (2)$$

where $T_\theta(v)$ is a threshold function that sets all the entries in v larger than $\theta$ as 1 and 0 otherwise. w is a weight vector that penalizes annotations that dominate the database, which annotations therefore are more likely to appear in R than other less frequent annotations. In certain example embodiments, the image annotation system uses $(a) = N_a^{-0.7}$, where $N_a$ is the frequency of annotation a.

To find an optimal similarity matrix (M) that can measure the semantic similarity between image pairs, the image annotation system may implement the idea of large margin nearest neighbor metric learning. The optimal similarity matrix (M) may be defined such that, when a training image $x_i$ is compared against the images in its reference set $R_i$ under the similarity function M, the similarity score is higher for those images annotated similarly as $x_i$ than those images whose annotations are far from $x_i$'s annotations. Formally, this definition may be stated as a condition that $$s_{ij} > s_{ik}, \text{ if } d_Y(y_i, y_j) < d_Y(y_i, y_k), \forall j, k \in R_i, \quad (3)$$

where $s_{ij} = x_i^T M x_j$ is the similarity between $x_i$ and $x_j$, $s_{ik} = x_i^T M x_k$ is the similarity between $x_i$ and $x_k$, and $d_Y(,)$ is the distance between annotations, which may be implemented using Hamming distance in various example embodiments of the image annotation system. Solving the following optimization problem makes the similarity matrix (M) satisfy the constraints in Equation (3):

$$M^* = \underset{M}{\mathrm{argmin}} \sum_{(i,j,k) \in \mathfrak{T}} \min(0, b - x_i^T M (x_j - x_k)) \quad (4)$$

where $\mathfrak{T} = \{(i, j, k) \mid j \in R_i, d_Y(y_i, y_j) < d_Y(y_i, y_k)\}$ is the set of all training triplets, and b is a positive value that controls the margin of similarity differences. Such a locally shared similarity function only utilizes triplets of images in the set $\mathfrak{T}$, as opposed to traditional metric learning techniques which consider all image triplets in the entire data space. This feature significantly reduces the number of image triplet constraints to be satisfied, thus improving the learning efficiency. Also, since the data distribution is simplified to a local space (e.g., neighborhood) by the previous retrieval step, the similarity learning task is correspondingly simplified such that a bilinear similarity function (e.g., utilizing the similarity matrix (M)) is able to correctly model the similarity relationships among the images.

To solve the optimization problem in Equation (4), various example embodiments of the image annotation system employ a stochastic gradient descent technique. For example, the image annotation system may start by initializing the similarity matrix (M) with a reasonable value, such as an identity matrix. Then, the image annotation system may update the similarity matrix (M) iteratively by going through the whole training set in random order multiple times until the similarity matrix (M) converges. On each processing of each training image $x_i$, its reference set $R_i$ is first found by retrieving the remaining training images using $x_i$ as query. Then the image annotation system searches for an index pair (j, k) from the set $R_i$, which satisfies $d_Y(y_i, y_j) < d_Y(y_i, y_k)$ and $x_i^T M(x_j - x_k) < b$. If no such pair (j, k) exists, then the image annotation system skips the current training image $x_i$ and proceeds to the next one $x_{i+1}$. Otherwise, the image annotation system selects the pair (j, k) which minimizes $x_i^T M(x_j - x_k)$ and uses the image triplet $(x_i, x_j, x_k)$ to update the similarity matrix (M) according to the following equation:

$$M \leftarrow M + \tau [x_i(x_j - x_k)^T + (x_j - x_k)x_i^T]. \quad (5)$$

$\tau$ is a positive step size that shrinks with each iteration. The updated values in the similarity matrix (M) may be obtained by taking the derivation of the loss term in Equation (4) and projecting to symmetric space. The updated similarity matrix (M) may then be used to evaluate the similarity between images in future iterations. Upon convergence, the optimized similarity matrix (M) can be subsequently used to measure the similarity of any images within a local neighborhood within the global data space.

According to various example embodiments, one or more of the methodologies described herein may advantageously facilitate annotation (e.g., tagging) of a test image. Moreover, one or more of the methodologies described herein may facilitate efficient retrieval of similar images from a large database of previously tagged reference images, accurate measurements of semantic similarity with respect to both global and local data distribution within the large database, robust performance despite the presence of label noise (e.g., accidentally applied tags on some images), or any suitable combination thereof. Furthermore, one or more the methodologies described herein may be readily scalable to accommodate new images, new tags, and new meanings of existing tags.

When these effects are considered in aggregate, one or more of the methodologies described herein may obviate a need for certain efforts or resources that otherwise would be involved in annotating an image. Efforts expended by a user in annotating an image may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 11:
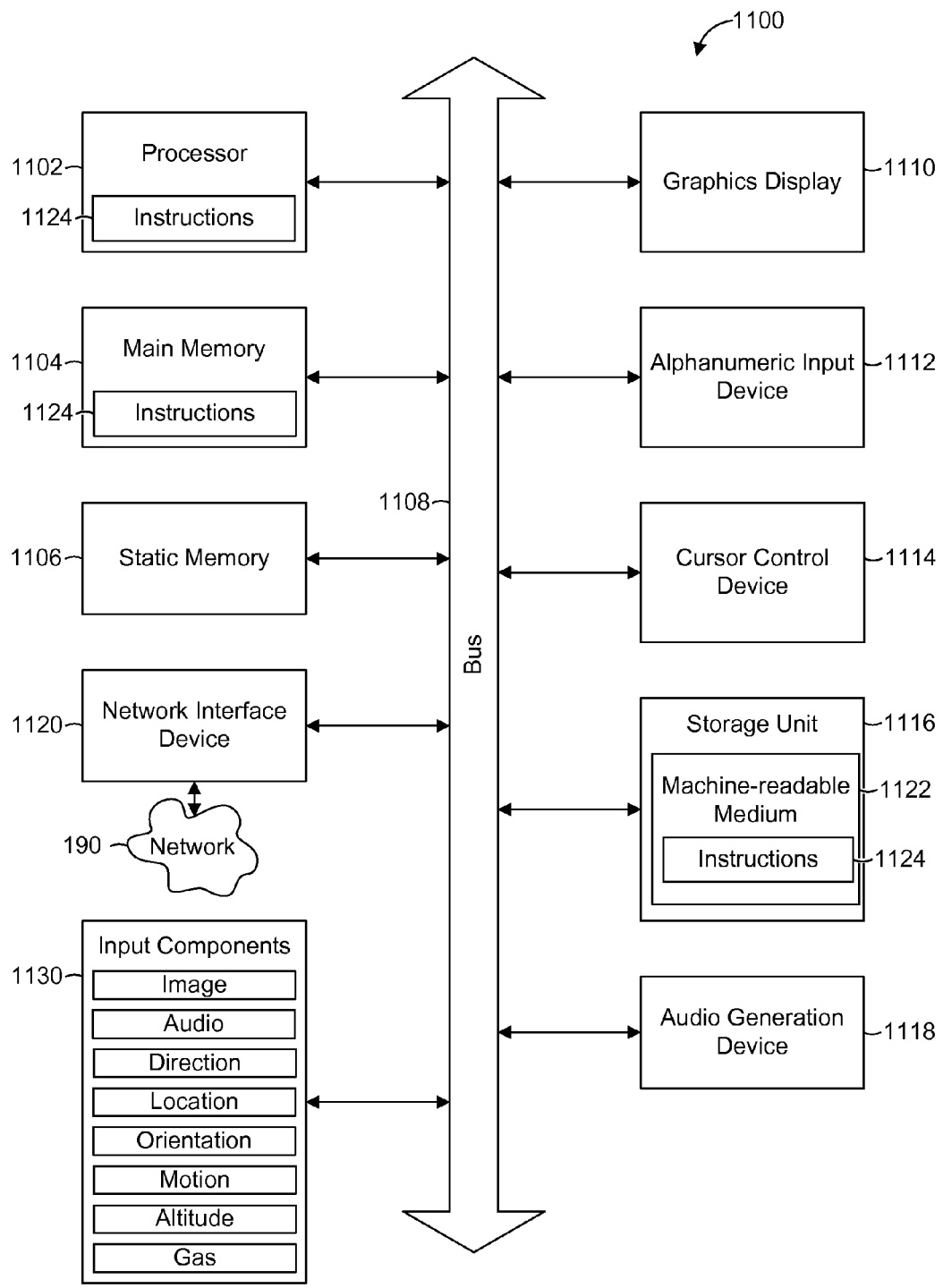
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a machine-readable storage medium, a computer-readable storage medium, or any suitable combination thereof) and perform any one or more of the methodologies discussed herein, in whole or in part. Specifically, FIG. 11 shows the machine 1100 in the example form of a computer system within which the instructions 1124 (e.g., software, a program, an application, an applet, an app, or other executable code) for causing the machine 1100 to perform any one or more of the methodologies discussed herein may be executed, in whole or in part. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
  accessing an untagged image that is to be tagged;
  generating a set of vectors by mathematically transforming the untagged image and regions of the untagged image;
  querying a database of tagged images by submitting the set of vectors as search criteria to a search engine configured to search the database, the querying of the database obtaining a set of tagged images;
  ranking the set of tagged images according to similarity scores that quantify degrees of similarity between the untagged image and each tagged image in the set of tagged images, wherein the similarity scores are calculated based on a similarity matrix that provides a higher similarity score for two images within the set of tagged images that have similar tags than for two images within the set of tagged images that have dissimilar tags; and
  annotating the untagged image with tags from a subset of the ranked set of tagged images, the annotating being performed by a processor of a machine based on the similarity scores and ranks of tagged images within the subset.

2. The method of claim 1, wherein:
  the tagged images are reference images each annotated by at least one tag; and
  the querying of the database includes indexing the tagged reference images.

3. The method of claim 1, wherein:
  the querying of the database includes retrieving the set of tagged images based on a bag-of-words analysis of visual features in each tagged image in the database.

4. The method of claim 1, wherein:
  the querying of the database includes retrieving the set of tagged images based on spatial arrangement analysis of visual features in each tagged image in the database.

5. The method of claim 1, wherein the similarity matrix comprises
  a bilinear similarity matrix.

6. The method of claim 5 further comprising:
generating the bilinear similarity matrix in satisfaction of a condition that the bilinear similarity matrix causes a first similarity score between a first tagged image in the database and a second tagged image in the database to exceed a second similarity score between the first tagged image and a third tagged image in the database as a consequence of a first mathematical distance between tags of the first tagged image and tags of the second tagged image being less than a second mathematical distance between tags of the first tagged image and tags of the third tagged image.

7. The method of claim 6, wherein:
the generating of the bilinear similarity matrix includes:
accessing a first version of the bilinear similarity matrix; and
generating a second version of the bilinear similarity matrix in response to a determination that an image triplet inclusive of the first tagged image, the second tagged image, and the third tagged image satisfies the condition.

8. The method of claim 7, wherein:
the generating of the bilinear similarity matrix includes setting the first version of the bilinear similarity matrix to an identity matrix.

9. The method of claim 6 further comprising:
calculating a rank score of a tagged image among the set of tagged images based on a rank of the tagged image.

10. The method of claim 9 further comprising:
determining the tags based on the rank score of the tagged image, a set of annotations stored in metadata of the tagged image, and a threshold function applicable to the set of annotations stored in the metadata of the tagged image.

11. The method of claim 10, wherein:
the determining of the tags is based on a weight vector that reduces a likelihood that an annotation is included in the tags based on a frequency with which the annotation occurs in the database of tagged images.

12. The method of claim 6, wherein:
the generating of the bilinear similarity matrix includes:
accessing the first tagged image from the database of tagged images;
generating a first vector from the first tagged image;
querying the database to obtain a further set of tagged images based on the first vector; and
determining that an image triplet inclusive of the first tagged image, the second tagged image, and the third tagged image satisfies the condition.

13. The method of claim 7, wherein:
the generating of the bilinear similarity matrix includes:
calculating a difference that corresponds to the image triplet between the first similarity score and the second similarity score; and
determining that the difference that corresponds to the image triplet is a minimum difference among image triplets that include the first tagged image and two further tagged images from the further set of tagged images.

14. The method of claim 5 further comprising:
determining a first feature vector of a first candidate image and a second feature vector of a second candidate image; and
calculating a further similarity score based on the bilinear similarity matrix, the further similarity score quantifying a degree of similarity between the first and second candidate images.

15. A non-transitory machine-readable storage medium comprising instructions that, when executed by one or more processors of a machine, cause the machine to perform operations comprising:
accessing an untagged image that is to be tagged;
generating a set of vectors by mathematically transforming the untagged image and regions of the untagged image;
querying a database of tagged images by submitting the set of vectors as search criteria to a search engine configured to search the database, the querying of the database obtaining a set of tagged images;
ranking the set of tagged images according to similarity scores that quantify degrees of similarity between the untagged image and each tagged image in the set of tagged images, wherein the similarity scores are calculated based on a similarity matrix that provides a higher similarity score for two images within the set of tagged images that have similar tags than for two images within the set of tagged images that have dissimilar tags; and
annotating the untagged image with tags from a subset of the ranked set of tagged images, the annotating being based on the similarity scores and ranks of tagged images within the subset.

16. The non-transitory machine-readable storage medium of claim 15, wherein:
the similarity matrix is a bilinear similarity matrix; and
the bilinear similarity matrix is generated in satisfaction of a condition that the bilinear similarity matrix causes a first similarity score between a first tagged image in the database and a second tagged image in the database to exceed a second similarity score between the first tagged image and a third tagged image in the database as a consequence of a first mathematical distance between tags of the first tagged image and tags of the second tagged image being less than a second mathematical distance between tags of the first tagged image and tags of the third tagged image.

17. The non-transitory machine-readable storage medium of claim 16, wherein the operations further comprise:
determining a first feature vector of a first candidate image and a second feature vector of a second candidate image; and
calculating a further similarity score based on the bilinear similarity matrix, the further similarity score quantifying a degree of similarity between the first and second candidate images.

18. A system comprising:
one or more processors; and
one or more computer storage media storing computer-executable instructions that, when executed by the one or more processors, implement a method comprising:
accessing an untagged image that is to be tagged;
generating a set of vectors by mathematically transforming the untagged image and regions of the untagged image;
querying a database of tagged images by submitting the set of vectors as search criteria to a search engine configured to search the database, the querying of the database obtaining a set of tagged images;
ranking the set of tagged images according to similarity scores that quantify degrees of similarity between the untagged image and each tagged image in the set of tagged images, wherein the similarity scores are calculated based on a similarity matrix that provides a higher similarity score for two images within the set of tagged images that have similar tags than for two images within the set of tagged images that have dissimilar tags; and annotating the untagged image with tags from a subset of the ranked set of tagged images, the annotating being performed by a processor of a machine based on the similarity scores and ranks of tagged images within the subset.

19. The system of claim 18, wherein:

the similarity matrix is a bilinear similarity matrix; and the bilinear similarity matrix is generated in satisfaction of a condition that the bilinear similarity matrix causes a first similarity score between a first tagged image in the database and a second tagged image in the database to exceed a second similarity score between the first tagged image and a third tagged image in the database as a consequence of a first mathematical distance between tags of the first tagged image and tags of the second tagged image being less than a second mathematical distance between tags of the first tagged image and tags of the third tagged image.

20. The system of claim 19, wherein the method further comprises:

determining a first feature vector of a first candidate image and a second feature vector of a second candidate image; and calculating a further similarity score based on the bilinear similarity matrix, the further similarity score quantifying a degree of similarity between the first and second candidate images.

* * * * *